US011667534B2

(12) United States Patent
Crooks et al.

(10) Patent No.: US 11,667,534 B2
(45) Date of Patent: Jun. 6, 2023

(54) METHOD FOR EXTRACTING SOLUBLE SI FROM AN AMORPHOUS SIO₂ BEARING MATERIAL

(71) Applicant: AGRIPOWER AUSTRALIA LIMITED, Sydney (AU)

(72) Inventors: Regan Crooks, Sydney (AU); William Hawker, Sydney (AU); Darcy O'Brien, Sydney (AU)

(73) Assignee: AGRIPOWER AUSTRALIA LIMITED, Sydney (AU)

( * ) Notice: Subject to any disclaimer, the term of this patent is extended or adjusted under 35 U.S.C. 154(b) by 45 days.

(21) Appl. No.: 17/058,129

(22) PCT Filed: May 24, 2019

(86) PCT No.: PCT/AU2019/050518
§ 371 (c)(1),
(2) Date: Nov. 23, 2020

(87) PCT Pub. No.: WO2019/222813
PCT Pub. Date: Nov. 28, 2019

(65) Prior Publication Data
US 2021/0380423 A1 Dec. 9, 2021

(30) Foreign Application Priority Data
May 25, 2018 (AU) .............................. 2018901835

(51) Int. Cl.
| C01B 33/32 | (2006.01) |
| C05G 5/23 | (2020.01) |
| C05G 3/40 | (2020.01) |
| C05D 1/00 | (2006.01) |
| C05D 9/02 | (2006.01) |
| C09K 17/12 | (2006.01) |

(52) U.S. Cl.
CPC ............ *C01B 33/325* (2013.01); *C05D 1/005* (2013.01); *C05D 9/02* (2013.01); *C05G 3/44* (2020.02); *C05G 5/23* (2020.02); *C09K 17/12* (2013.01)

(58) Field of Classification Search
None
See application file for complete search history.

(56) References Cited

U.S. PATENT DOCUMENTS

| 2,869,996 A * | 1/1959 | Vierling .................... C05B 7/00 71/30 |
| 2,869,998 A * | 1/1959 | Vierling .................... C05B 7/00 71/37 |
| 5,833,940 A | 11/1998 | Reiber et al. |
| 2008/0121005 A1* | 5/2008 | Lancaster ................. C05G 3/00 71/24 |
| 2011/0143941 A1* | 6/2011 | Archer ..................... C03C 12/00 241/30 |
| 2020/0079702 A1* | 3/2020 | Matychenkov .......... C05G 5/12 |

FOREIGN PATENT DOCUMENTS

| CN | 105254428 | 1/2016 |
| CN | 107098783 A | 8/2017 |
| GB | 2091711 A | 8/1982 |
| JP | H-08104513 A | 4/1996 |
| WO | WO 2018/169411 A1 * | 9/2018 ............... C05D 9/00 |

OTHER PUBLICATIONS

Friedrich, S. et al "Chemical and Microbiological Solubilization of Silicates", Acta Biotechnologica 11 (1991) 3, 187-196.*
International Search Report for Application No. PCT/AU2019/050518, dated Sep. 2, 2019.
Supplementary European Search Report for EP19806657 dated Jan. 31, 2022.
Isakandar Ferry "Sponsoring Organizations", AIP Proceedings vol. 1555 International Conference on Theoretical and Applied Physics, Jan. 1, 2013 (Jan. 1, 2013), XP055885277.
Munasir Sulon A et al, "Synthesis of Silica Nano Powder Extracted from Slopeng Natural Sanf via Alkalifusion Route", Jan. 1, 2013 (Jan. 1, 2013), XP055885287.
Wahyudi Agus et al., "Preparation of Nano Silicia from Silica Sand Through Alkali Fusion", Indonesian Mining Journal, vol. 16, No. 3, Oct. 2013, Oct. 1, 2013 (Oct. 1, 2013), pp. 149-153, XP055885372.

* cited by examiner

*Primary Examiner* — Wayne A Langel
(74) *Attorney, Agent, or Firm* — Moser Taboada

(57) ABSTRACT

The present invention relates to bioavailable (which may also be referred to as plant available) silicon, such as in the form of a concentrate or solid, and processes for producing and using bioavailable silicon.

17 Claims, 4 Drawing Sheets

METHOD FOR EXTRACTING SOLUBLE SI FROM AN AMORPHOUS $SIO_2$ BEARING MATERIAL

FIELD OF THE INVENTION

The present invention relates to bioavailable (which may also be referred to as plant available) silicon, such as in the form of a concentrate or solid, and processes for producing and using bioavailable silicon.

BACKGROUND OF THE INVENTION

Research and interest in the application of silicon for agricultural purposes has increased over the recent decades as the beneficial mechanisms of silicon in plant biology are further understood. Silicon is recognised as a beneficial fertiliser for plant growth and development. In particular, silicon fertilisers have demonstrated direct beneficial results, such as: improving absorption and translocation of macro-nutrient and micronutrient elements, increasing the mechanical strength of cell walls, mitigating or abolishing the adverse effects of heavy metals, and improving resistance to attacks by fungi, parasitic higher plants, and phytophagous insects. The application of silicon fertilisers is well known to reduce abiotic and biotic stress, thereby significantly improving agricultural production.

Production of silicon fertilisers has increased by 20 to 30% annually since 2000. Although there is increasing interest in the use of silicon fertilisers, for the silicon to be useful it must be bioavailable, meaning that the silicon should be in a dissolved or otherwise provided in a readily soluble or plant available form. Typical silicon fertilisers are in the form of a solid which are only slightly soluble, which means that after their application they slowly release silicon. As such, these slow release fertilisers have limited practical applicability. It would be preferable to provide a silicon containing fertiliser with silicon that can be released or taken up by a plant more quickly. However, there are significant difficulties in producing solubilised and stable silicon containing solutions and/or solid silicon containing fertilisers having silicon in a readily soluble or plant available form.

Typical solid sources of silicon are relatively insoluble however some sources of silicon are slightly more soluble than others i.e. solubilities of $10^{-2.74}$ M and $10^{-4}$ M for amorphous silica and crystalline quartz, respectively, in near neutral aqueous systems.

Current methods of producing soluble concentrated silicon solutions utilise crystalline forms of silicon as the silicon source. Dissolving this crystalline silicon into a caustic solution requires high temperature and pressure conditions (greater than 200° C.) to achieve a commercially relevant rate of silicon dissolution. The conditions used to produce these concentrated silicon solutions are highly alkaline, hence they are not suitable for direct application to plants and must be diluted to achieve a suitable pH. Once diluted to a pH which is suitable for application to plants, the concentration of silicon in solution becomes very low due to the high amount of dilution required.

GB2,091,711A (CHIN-LIND CHAING; LANE-WAN SHEEN) discusses baking or kilning of a solid alkali and solid silica in high temperature and above atmospheric pressure to form a solid reaction product from the solid alkali and solid silica. In a separate step, the reaction product is then washed to dissolve silica species from it, thereby forming a liquid including soluble silicic species.

U.S. Pat. No. 5,833,940 (REIBER ET AL) is directed to the production of commercial grade soluble silicate solutions for use as adhesives and cements, coatings, gels and catalyst, silica sols and water treatment, detergents, foundry molds, chemical fixaxtion and waste solidification, and discusses alkali treatment of biogenetic silica from rice hull ash in the presence of burnt carbon to generate a soluble silicate solution having the water white characteristic required for these commercial applications. A solid residue that predominantly contains activated carbon is formed as a secondary product JP H08-104513 A (SUDA TAKEKO) is also directed to production of commercial grade silica and discusses formation of a solution including soluble silicic species, followed by acid treatment which removes the silicic species from the solution into a solid residue. The solid residue is then recovered and may be washed to remove carbon contaminants.

An object of the invention is to provide a method for preparing silicon containing products from an amorphous silica bearing material which can be (directly or indirectly) applied to crops to provide a source of soluble silicon and which therefore address one or more of the abovementioned shortcomings.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect of the invention, there is provided a method for extracting soluble Si compounds from an amorphous silica bearing material, the method including:
  leaching a silica bearing material with an alkaline solution to convert at least a portion of amorphous silica in the silica bearing material to a soluble silicic species and form a leachate including the soluble silicic species and a solid residue;
  separating the leachate from the solid residue.

In a second aspect of the invention, there is provided a method for preparing a solid residue including reacted silica from an amorphous silica bearing material, the method including:
  treating a silica bearing material with an alkaline solution to convert at least a portion of amorphous silica in the silica bearing material to reacted silica and to form a leachate and a solid residue including the reacted silica;
  separating the leachate from the solid residue.

In a third aspect of the invention, there is provided a method for extracting soluble Si compounds from an amorphous silica bearing material, the method including: leaching a silica bearing material selected from the group consisting of
  diatomaceous earth, a precipitated silica, and a silicate slag with an alkaline solution to convert at least a portion of amorphous silica in the silica bearing material to a soluble silicic species and form a leachate including the soluble silicic species and a solid residue;
  separating the leachate from the solid residue.

In a fourth aspect of the invention there is provided a method for extracting soluble Si compounds from an amorphous silica bearing material, the method including:
  combining a silica bearing material with an alkaline solution to form a slurry;

leaching the silica bearing material with the alkaline solution in the slurry to convert at least a portion of amorphous silica in the silica bearing material to a soluble silicic species and form a leachate including the soluble silicic species and a solid residue;

separating the leachate from the solid residue.

In an embodiment of the first, second, third or fourth aspects, the method further includes drying the solid residue.

In a fifth aspect of the invention, there is provided a method for extracting soluble Si compounds from an amorphous silica bearing material, the method including:

leaching a silica bearing material with an alkaline solution in conditions for converting at least a portion of amorphous silica in the silica bearing material to a soluble silicic species, said conditions enabling the formation of:

(i) a leachate including the soluble silicic species, optionally wherein the leachate constitutes about 1 to 80% of silica in the silica bearing material; and (ii) a solid residue including the soluble silicic species, optionally wherein the solid residue constitutes about 20 to 99% of silica in the silica bearing material; and separating the leachate from the solid residue, optionally to form a solid residue having a water content of about 5 to 60% by weight of the solid residue.

Preferably, in an embodiment of the fifth aspect, the method does not include the step of removing metals or metal salts from the leachate or from the solid residue.

In a sixth aspect there is provided a method for extracting soluble Si compounds from an amorphous silica bearing material, the method including calcining a silica bearing material to form a calcined silica bearing material:

leaching the calcined silica bearing material with an alkaline solution to convert at least a portion of amorphous silica in the calcined silica bearing material to a soluble silicic species and form a leachate including the soluble silicic species and a solid residue;

separating the leachate from the solid residue.

In a seventh aspect there is provided a method for extracting soluble Si compounds from a silica bearing material that includes amorphous silica and crystalline silica, the method including leaching a silica bearing material with an alkaline solution to convert at least a portion of amorphous silica in the silica bearing material to a soluble silicic species and form a leachate including the soluble silicic species and a solid residue;

separating the leachate from the solid residue. In an embodiment of this aspect of the invention, the silica bearing material may be an ore that includes a mineral silicate having a crystalline silica structure and further including an amorphous silica associated with the mineral silicate. According to the embodiment, the leachate arises from leaching of the amorphous silica in the ore. Examples of mineral silicates that may be present in an ore of this embodiment of the invention include olivine, serpentine, mica, feldspar, quartz, amphibole, and pyroxene.

In various embodiments, the silicic species is in the form of $H_4SiO_4$ (particularly where the silicic species is in a soluble form), and/or polysilicic acids, and or colloidal particles thereof. Whilst polysilicic acids and colloidal particles thereof exhibit low solubility, these silicic species are readily convertible to $H_4SiO_4$.

Whilst the invention contemplates a wide range of different alkaline solutions, including carbonates, bicarbonates, hydroxides etc, it is preferred that the alkaline solution is a hydroxide. In some cases, the use of carbonates has the drawback of requiring significant subsequent dilution to bring the solution pH down to a level where the solution may be applied to crops. This is due to the speciation and buffering effect of the carbonate ion in solution.

Similarly, while a wide range of counter-ion to the carbonates, bicarbonates, hydroxides is contemplated, (such as metal ions, and in particular alkali metal ions) it is preferred that the counter-ion is potassium. The use of sodium carbonate, or other metal elements in their carbonate or hydroxide form are not well suited to in certain applications as fertilisers as these metals can increase the salinity of the water applied to the plants.

In an embodiment of the first, second, third, fourth, fifth, sixth or seventh aspects, the alkaline leaching solution is a potassium hydroxide (KOH) solution.

In an embodiment of the first, second third, fourth, fifth, sixth or seventh aspects, the step of leaching the amorphous silica bearing material with the alkaline solution is conducted at a temperature of from about ambient to about 95° C. Preferably, the temperature is from about 40° C. More preferably, the temperature is from about 50° C. Even more preferably, the temperature is from about 60° C. Most preferably, the temperature is from about 60° C. Alternatively, or additionally, it is preferred that the temperature is up to about 90° C. More preferably, the temperature is up to about 85° C. In one form of the invention, the temperature is 80° C.±5° C.

In an embodiment of the first, second, third, fourth, fifth, sixth or seventh aspects, the step of leaching the amorphous silica bearing material with the alkaline solution includes initially forming a reaction mixture, such as a slurry, of the amorphous silica bearing material and the alkaline solution leachant. Preferably, the reaction mixture is agitated during the step of leaching the amorphous silica.

In one form of the above embodiment, the reaction mixture includes no added osmolyte compounds, and/or surfactants, and/or gums, and/or polymers.

In one form of the above embodiment, the method further includes heating the reaction mixture to a temperature greater than ambient and up to 95° C. under ambient pressure. Preferably, the temperature is from about 40° C. More preferably, the temperature is from about 50° C. Even more preferably, the temperature is from about 60° C. Most preferably, the temperature is from about 60° C. Alternatively, or additionally, it is preferred that the temperature is up to about 90° C. More preferably, the temperature is up to about 85° C. In one form of the invention, the temperature is 80° C.±5° C.

In an embodiment of the first, second, third, fourth, fifth, sixth or seventh aspects, the amorphous silica bearing material is present in the reaction mixture at an amount of from about 1 wt % to about 85 wt %. The skilled person will appreciate that the reaction mixture may be in the form of a slurry, suspension, or a solution. Preferably, the amount is from about 10 wt %. More preferably, the amount is from about 15 wt %. Even more preferable, the amount is from about 20 wt %. Still more preferably, the amount is from about 25 wt %. Most preferably, the amount is from about 30 wt %. Alternatively, or additionally, the amount is up to 60 wt %. More preferably, the amount is up to 50 wt %. Even more preferably, the amount is up to 40 wt %. Most preferably, the amount is up to 35 wt %.

In various forms of the above embodiment, the reaction mixture has a solids to alkaline solution ratio of from 0.1:1.0 to 0.5:1.0.

In an embodiment of the first, second, third, fourth, fifth, sixth or seventh aspects, the reaction mixture includes an amount of alkaline solution of sufficient pH to provide the reaction mixture with an initial pH of 10.8 or greater, such as pH 11 or greater. Preferably, the initial pH is 12 or greater. Most preferably, the initial pH is 13 or greater. In preferred forms, where the alkaline solution is a potassium hydroxide solution, the reaction mixture includes sufficient potassium hydroxide to provide the reaction mixture with an initial pH of 11 or greater. Preferably, the initial pH is 12 or greater. Most preferably, the initial pH is 13 or greater. Alternatively, or additionally, especially where the silica bearing material is DE, the alkaline solution includes an amount of an alkaline reagent to provide a hydroxide to DE ratio of from about 20 g/kg-DE up to about 3000 g/kg-DE. Preferably, the hydroxide to DE ratio is from about 50 g/kg-DE. Preferably, the hydroxide to DE ratio is from about 100 g/kg-DE. More preferably, the hydroxide to DE ratio is from about 150 g/kg-DE. Most preferably, the hydroxide to DE ratio is from about 50 g/kg-DE. Preferably, the hydroxide to DE ratio is up to about 2000 g/kg-DE. More preferably, the hydroxide to DE ratio is up to about 1000 g/kg-DE. Even more preferably, the hydroxide to DE ratio is up to about 700 g/kg-DE. Most preferably, the hydroxide to DE ratio is up to about 500 g/kg-DE. In one particular embodiment, the hydroxide to DE ratio is 465±10% g/Kg-DE. Notwithstanding these ratio values, the skilled person will appreciate that a number of other factors, including but not limited to factors such as the amount and type of non-amorphous silica impurities, the grade of amorphous silica in the DE, and surface area of the solid phases, will affect the required alkaline reagent dosage.

In an embodiment of the first, second, third, fourth, fifth, sixth or seventh aspects, an amount of the alkaline solution of sufficient pH is used so that, after the step of separating the leachate from the solid residue, the leachate has a pH of 11 or greater. More preferably, the leachate has a pH of 11.5 or greater. In preferred forms, where the alkaline solution is a potassium hydroxide solution, sufficient potassium hydroxide is used so that, after the step of separating the leachate from the solid residue, the leachate has a pH of 11 or greater. More preferably, the leachate has a pH of 11.5 or greater.

In preferred embodiments of the first, second, third, fourth, fifth, sixth or seventh aspects where the alkaline solution is a KOH solution, the KOH is present in an amount of from about 20 g/L up to about 300 g/L. Preferably, the amount is from about 30 g/L. Most preferably, the amount is from about 40 g/L. Alternatively, or additionally, the amount is up to about 280 g/L. More preferably, the amount is up to about 260 g/L. Most preferably, the amount is up to about 250 g/L. In one form the amount is about 40-45 g/L. In another form, the amount is from about 75-85 g/L. In still another form, the amount is from about 225-275 g/L.

In an embodiment of the first, second, third, fourth, fifth, sixth or seventh aspects, the step of leaching the amorphous silica bearing material with the alkaline leachant is conducted at ambient pressure. By ambient pressure, it is meant that the process is operated at atmospheric conditions, and that the pressure is about atmospheric pressure, e.g. 1 atm.

In an embodiment of the first, second, third fourth, fifth, sixth or seventh aspects, the amorphous silica bearing material is crushed prior to use in leaching. By way of example, the amorphous silica material may be provided in the form of a powder having an average particle size of 10 mm or less. Preferably, the particle size is 8 mm or less. More preferably, 6 mm or less. Most preferably, 4 mm or less.

In an embodiment, the amorphous silica bearing material is provided in the form of a −3/8 in. mesh powder. Preferably, the silica bearing material is in the form of a −5/16 in. mesh powder. More preferably, the silica bearing material is in the form of a −1/4 in. mesh powder. Most preferably, the silica bearing material is in the form of a −5 mesh powder.

In an embodiment of the first or second, fourth, fifth, sixth or seventh aspects, the silica bearing material is or includes: diatomaceous earth, rice hull ash, rice husk, fly ash, or precipitated silica, silicate slags (and in particular calcium silicate slags). The diatomaceous earth is preferably of freshwater origin, and more preferably does not include cristobalite.

In an embodiment of the first or second, fourth or fifth aspects, where the silica bearing material is a source of biogenetic silica, such as rice husk or rice hull ash the process may form a leachate including a soluble silicic species and solid residue including a soluble silic species. The leachate may contain 60 to 95% of silica in the rice hull ash or rice husk. The solid residue may contain 5 to 40% of silica in the rice hull ash or rice husk.

In an embodiment of the first or second, fourth or fifth aspects, where the silica bearing material is a source of biogenetic silica, such as rice husk or rice hull ash the process may include a separation step for separating the leachate from the solid residue. The result of the separation may be a solid residue having a water content of about 5 to 60 w/w % of the solid residue. The water content may arise from imperfect separation of leachate from the solid residue whereby leachate remains entrained with the solid residue. The solid residue may be utilised as a fertiliser in this form. Alternatively, the solid residue may be dried to reduce water content to about 0 to 50% w/w solid residue and then utilised as a fertiliser.

In an eight aspect there is provided a method for extracting soluble Si compounds from glass, the method including
  leaching glass with an alkaline solution to convert at least a portion of amorphous silica in the glass to a soluble silicic species and form a leachate including the soluble silicic species and a solid residue;
  separating the leachate from the solid residue.

In a ninth aspect there is provided a method for forming a leachate containing a soluble silicic species from glass, the method including:
  leaching glass with an alkaline solution to convert at least a portion of amorphous silica in the glass to a soluble silicic species and form a leachate
  thereby forming a leachate containing a soluble silicic species.

In an embodiment of the above described aspects concerning extracting soluble Si compounds from glass, or concerning forming a leachate containing a soluble silicic species from glass, the glass may be re-cycled glass, more specifically, glass that has been proposed for re-cycling, such as internal and external cullet. Some sources of glass proposed for re-cycling are not re-cycled because they derive from different coloured glasses and are composed of fragments of a size that makes it difficult to separate the fragments on the basis of like colour. In a preferred embodiment, the silica bearing material is a source of fragmented glass of different colour or of single colour.

In one embodiment, glass may have a fragment or particle size from 1 micron to 2 mm.

A leachate formed from leaching glass with an alkaline solution may comprise 1 to >99% of silica in the glass.

Where a solid residue containing a silicic species is also formed, the solid residue may comprise <1 to 99% of silica in the glass.

Whilst the invention of the eighth and ninth aspect contemplates a wide range of different alkaline solutions, including carbonates, bicarbonates, hydroxides etc, it is preferred that the alkaline solution is a hydroxide. Similarly, while a wide range of counter-ion to the carbonates, bicarbonates, hydroxides is contemplated, (such as metal ions, and in particular alkali metal ions) it is preferred that the counter-ion is potassium. Preferably the alkaline leaching solution is a potassium hydroxide (KOH) solution.

In an embodiment of the eighth or ninth aspects, the step of leaching the glass with the alkaline solution is conducted at a temperature of from about ambient to about 95° C. More preferably, the temperature is up to about 85° C. In one form of the invention, the temperature is 80° C.±5° C.

In an embodiment of the eighth or ninth aspects, the step of leaching the glass with the alkaline solution includes initially forming a reaction mixture, such as a slurry, of the glass and the alkaline solution leachant. Preferably, the reaction mixture is agitated during the step of leaching the glass.

In one embodiment of the eight or ninth aspect, the method further includes heating the reaction mixture to a temperature greater than ambient and up to 95° C. under ambient pressure.

In an embodiment of the eighth or ninth aspect, the reaction mixture has a solids to alkaline solution ratio of from 0.1:1.0 to 0.5:1.0.

In an embodiment of the eighth or ninth aspects, the reaction mixture includes an amount of alkaline solution of sufficient pH to provide the reaction mixture with an initial pH of 10.8 or greater, such as pH 11 or greater. Preferably, the initial pH is 12 or greater. Most preferably, the initial pH is 13 or greater. In preferred forms, where the alkaline solution is a potassium hydroxide solution, the reaction mixture includes sufficient potassium hydroxide to provide the reaction mixture with an initial pH of 11 or greater.

In an embodiment of the eighth or ninth aspects, an amount of the alkaline solution of sufficient pH is used so that, after the step of separating the leachate from the solid residue, the leachate has a pH of 11 or greater.

In preferred embodiments of the eighth or ninth aspects where the alkaline solution is a KOH solution, the KOH is present in an amount of from about 20 g/L up to about 300 g/L. Preferably, the amount is from about 30 g/L. Most preferably, the amount is from about 40 g/L. Alternatively, or additionally, the amount is up to about 280 g/L. More preferably, the amount is up to about 260 g/L. Most preferably, the amount is up to about 250 g/L. In one form the amount is about 40-45 g/L. In another form, the amount is from about 75-85 g/L. In still another form, the amount is from about 225-275 g/L.

In an embodiment of the eighth or ninth aspect, the step of leaching the glass with the alkaline leachant is conducted at ambient pressure.

In an embodiment of the first to ninth aspects, the step of leaching the glass with the alkaline solution is conducted for a time of at least 0.5 hours and up to 96 hours. Preferably, the time is up to 16 hours. More preferably, the time is up to 8 hours. Even more preferably, the time is up to 4 hours. Still more preferably, the time is up to 3 hours. Most preferably, the time is up to 2 hours.

In an embodiment of the first to ninth aspects, the step of leaching the glass with the alkaline solution is conducted for a time of at least form 1.5 hours to 2.5 hours.

In an embodiment of the first or third to ninth aspects, the leachate includes a soluble silicic species and the soluble silicic species is in the leachate at a concentration of from 10 g-Si/L to 150 g-Si/L. Preferably, the soluble silicic species is in the leachate at a concentration of from 15 g-Si/L. Most preferably, the soluble silicic species is in the leachate at a concentration of from 20 g-Si/L.

In an embodiment of the first to eighth aspects, the solid residue includes silicic species and residual soluble silicates, for example, where potassium hydroxide is used, the solid residue may include potassium silicate. In one or more forms of this embodiment, the method further includes washing the solid residue to dissolve at least a portion of the potassium silicates and form a wash liquor including the dissolved potassium silicates.

In one embodiment of the first or third to ninth aspects, the method further includes subjecting the leachate to evaporation to further concentrate the soluble silicic species.

In one embodiment of the first or third to ninth aspects, the method includes diluting the leachate to a pH suitable for application to plants. For example, by application as a foliar spray fertiliser, an irrigation fertiliser, a hydroponic fertiliser or a manual watering fertiliser.

In a tenth aspect of the invention, there is provided an aqueous silicon fertiliser concentrate including the leachate formed according to the methods of the first, or third to ninth aspect of the invention.

In an eleventh aspect of the invention, there is provided a solid silicon fertiliser including the solid residue formed according to the methods of the first to eighth aspect of the invention.

In a twelfth aspect of the invention, there is provided an aqueous silicon fertiliser concentrate including:
  an aqueous solution including soluble silicic species at a concentration of from 10 g-Si/L to 150 g-Si/L;
  wherein the aqueous solution has a pH of greater than pH 11; and
  wherein the aqueous solution is prepared by:
    leaching an amorphous silica bearing material with potassium hydroxide solution to convert at least a portion of the amorphous silica bearing material to a soluble silicic species and form an aqueous solution including the soluble silicic species and a solid residue;
    separating the aqueous solution from the solid residue.

In an embodiment, the soluble silicic species is in the leachate at a concentration of from 15 g-Si/L. More preferably, the soluble silicic species is in the leachate at a concentration of from 20 g-Si/L. Even more preferably, the soluble silicic species is in the leachate at a concentration of from 30 g-Si/L. Most preferably, the soluble silicic species is in the leachate at a concentration of from 40 g-Si/L.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
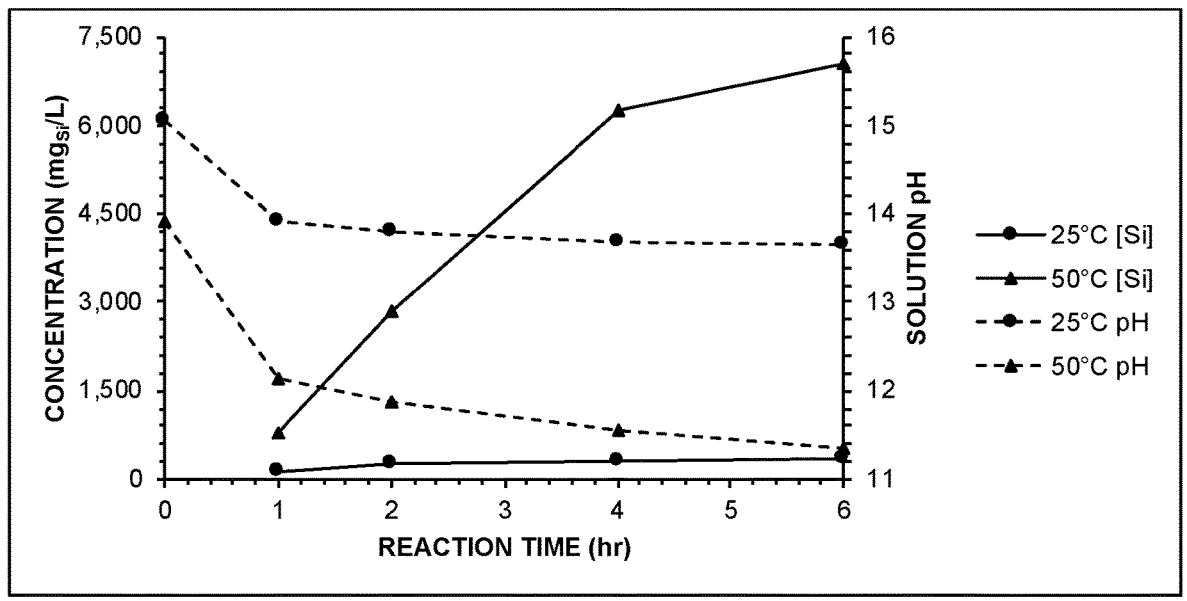
FIG. 1: Effect of temperature on the pH and concentration of silicon within solution over a six-hour agitation period.

The present invention generally relates to methods for forming a soluble silicon compound (in the form of silicic acid) concentrate, particularly for use as a fertiliser. Typically, the concentrate includes the soluble silicon compound in an amount of about 20 wt % with a solution pH in the range of 11-12. This concentrate can be diluted to form a silicon containing fertiliser with a pH appropriate for application to plants.

Table 1 provides concentrate product specifications according to one embodiment.

TABLE 1

Concentrate product specifications according to one embodiment.

| DESCRIPTION | UNITS | VALUES |
|---|---|---|
| Silicon (Si) | w/v | 6.0 |
| As silicic acid ($H_4SiO_4$) | w/v | 20.5 |
| Potassium (K) | w/v | 5.0 |
| Solution pH | — | 11-12 |
| SG | — | 1.10-1.20 |

EXAMPLE 1

Comparison of Silicon Concentrations within Solution at Relevant Solution pH Levels and their Respective Dilution Rates Solution samples were cyclically diluted in tap water, which was measured at pH 7.3 on the day of the tests. The cyclically diluted solutions were then sampled and diluted with sodium hydroxide (NaOH) solution for subsequent silicon concentration measured by ICP. The pH of each diluted solution was measured after completing the set of dilutions, measuring from lowest to highest to avoid cross contamination of alkaline solution into the diluted solutions.

Table 2 below provides solution pH and silicon concentration data interpolated between common dilution ratios compared with the alternative potassium silicate solution. This table shows that the alternative solution, while starting at a higher silicon concentration, ends up at a significantly lower silicon concentration after being diluted to a pH suitable for application to crops when compared with the solution of Table 1.

TABLE 2

Comparison of current claimed solution as per Table 1 and commercial potassium silicates with increasing dilution rates

| DILUTION RATE (L/L) | SOLUTION pH | | SILICON CONCENTRATION (mg/L) | |
|---|---|---|---|---|
| | Current Claimed Solution | Commercial Potassium Silicate | Current Claimed Solution | Commercial Potassium Silicate |
| — | 11.8 | 12.4 | 60,000 | 170,000 |
| 10 | 10.8 | 11.4 | 6,000 | 17,000 |
| 100 | 9.8 | 10.4 | 600 | 1,700 |
| 300 | 9.3 | 9.9 | 200 | 567 |
| 500 | 9.1 | 9.7 | 120 | 340 |
| 1,000 | 8.8 | 9.4 | 60 | 170 |
| 3,500 | 8.3 | 8.9 | 17 | 49 |
| 5,000 | 8.1 | 8.7 | 12 | 34 |

It is preferred to produce a concentrated silicon solution with a final solution pH and silicon concentration within a range that allows for dilution to a pH suitable for application to crops, whilst maintaining a relatively high concentration of silicon within solution.

EXAMPLE 2

Effect of Temperature on Reaction Rate and Extent

Effect of temperature on reaction rate and extent was evaluated in this example by reacting two samples of diatomite with $K_2CO_3$ in parallel experiments at room temperature and 50° C. Overhead impellers were inserted into two 1 L baffled glass reactors, and one reactor placed onto a hot plate.

520 g of DI water and 480 g of $K_2CO_3$ was added to each reactor, and the solutions agitated with the overhead impellers at 1,000 revolutions-per-minute (RPM) until no solid alkali was observable. pH and temperature probes were submerged within solution, and the hot plate was adjusted proportionally until the slurry temperature stabilised. 200 g of diatomite was added to each reactor and time was recorded with a stopwatch; with sampling of slurry conducted at intervals of 1, 2, 4, and 6 hours with a syringe filter, and pH and temperature of the slurry was recorded at each sampling interval.

FIG. 1 illustrates the effect of temperature on the kinetics of silicon extraction and pH for experiments conducted in parallel at room temperature and 50° C. Extraction rate within solution is significantly increased at 50° C. compared to at room temperature; approximately 7000 $mg_{Si}$/L versus 365 $mg_{Si}$/L after six hours of agitation, respectively.

The pH of solution exhibited similar trends for both trials; however, at 50° C. the pH of solution reached significantly lower value as compared with the room temperature pH of solution. The relationship between pH and hydroxide concentration is provided in Eqn. 1, and the generation of silicate anions in Eqn. 2.

$$pH-14 = -\log H^+ - 14 = \log OH^- \qquad \text{Eqn. 1}$$

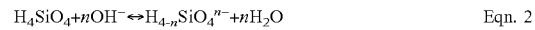

$$H_4SiO_4 + nOH^- \leftrightarrow H_{4-n}SiO_4{}^{n-} + nH_2O \qquad \text{Eqn. 2}$$

Further kinetic experiments relevant to this example investigated effects of temperature on reaction rate and extent over a wider range of temperatures with a KOH lixiviant. Kinetic tests were conducted at 50, 70, 80 and 90° C.

Due to the incremental upscaling of feed mass and equipment limitations, differing equipment modalities were chosen for various tests. 50° C. test utilised a horizontal shaking water bath, with a feed mass of 500 g and three replicates. 70° C. and 80° C. utilised a baffled 20 L electrically heated benchtop vessel, powered by a low shear rotary impeller. Feed mass was 10,000 g. As evaporative losses were a concern at 90° C., an electrically heated pressurised vessel horizontally rotating digestion unit was utilised. Feed mass was 40 g with six replicates.

Each experiment was conducted with the same feed composition as detailed in Table 3. Reaction time varied for each sample, however sampling was conducted on a regular basis to allow for comparison of reaction kinetics.

TABLE 3

Details of experiments investigating the effects of temperature on reaction rate and extent

| TRIAL | TEMPERATURE (° C.) | DIATOMITE (g) | KOH (g) | WATER (g) | TOTAL MASS (g) |
|---|---|---|---|---|---|
| 1 | 50 | 167 | 25 | 309 | 501 |
| 2 | 70 | 3,330 | 500 | 6,170 | 10,000 |
| 3 | 80 | 3,330 | 500 | 6,170 | 10,000 |
| 4 | 90 | 13.3 | 2.0 | 24.7 | 40 |

Figure 2:
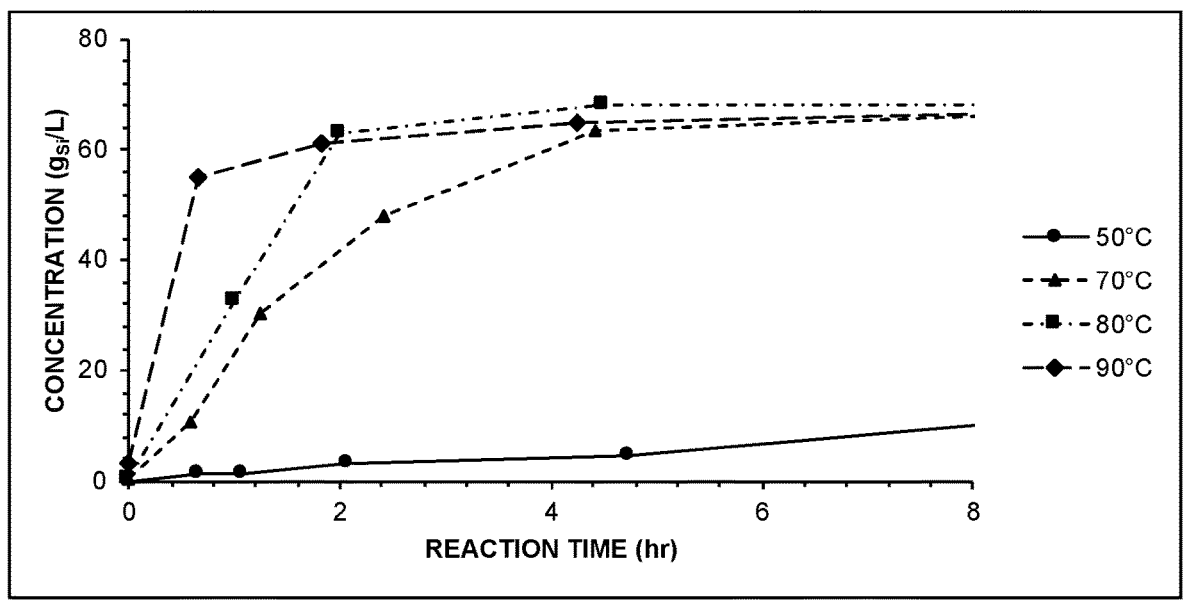
FIG. 2: Effect of temperature on the reaction rate and extent of leaching as per silicon concentration within solution (adjusted for evaporation).

FIG. 2 compares the reaction rates of silicon dissolution at temperatures 50° C., 70° C., 80° C., and 90° C. under constant experimental conditions. Characteristic of all tests is an initial linear response followed by a parabolic rate as the concentration of hydroxide declines, and a silicon solubility limit is indicated.

Table 4 provides a useful comparison of the results, utilising regression analysis to determine time elapsed at a silicon concentration that is 90% of the final recorded value. The declining rate yield with temperature indicates that the accelerated kinetics are less significant once solubility equilibrium is approached, with a substantial rate increase from 50° C. to 70° C., a moderate improvement at 80° C., and a minor improvement at 90° C.

TABLE 4

Comparison of rate of reaction with varying temperature at 90% of final extraction

| VALUES AT 90% FINAL EXTRACTION | LEACHING TEMPERATURE (° C.) | | | |
|---|---|---|---|---|
| | 50 | 70 | 80 | 90 |
| Silicon (g/L) | 41.3 | 59.5 | 63.2 | 60.1 |
| Leaching time (hrs) | 35.5 | 3.5 | 2.1 | 1.7 |

Higher temperatures, such as from 70° C. to 90° C., are preferred for this process, at a range where reaction kinetics and extent are optimised in conjunction with the practical and economic aspects of maintaining high temperatures within solution.

EXAMPLE 3

Effect of Initial Diatomite Concentration in Leaching

Effect of initial diatomite concentration in leaching was evaluated in this example by reacting four samples of diatomite with $K_2CO_3$ in parallel experiments in triplicate at room temperature. Reagents and DI water were added to 250 mL HDPE wide-mouth containers as per Table 5. Containers were placed in a bottle roller set at 40 RPM. Samples were maintained at 25° C. via a water bath situated within the bottle roller.

The samples were left overnight to ensure dissolution of the reagents within the containers. Diatomite was added to the respective containers, which were then placed back into the bottle roller to commence agitation; time was recorded and sampling was conducted at intervals of 4, 8, 24, 48, 96, 168, and 336 hours' total agitation time over a two-week period.

TABLE 5

Details of experiments investigating the effect of initial diatomite concentration in leaching

| TRIAL | TEMPERATURE (° C.) | DIATOMITE (g) | $K_2CO_3$ (g) | WATER (g) | TOTAL MASS (g) |
|---|---|---|---|---|---|
| 1 | 25 | 33.3 | 33.3 | 133.3 | 200 |
| 2 | 25 | 20.0 | 33.3 | 146.7 | 200 |
| 3 | 25 | 10.0 | 33.3 | 156.7 | 200 |
| 4 | 25 | 2.0 | 33.3 | 164.6 | 200 |

*Note:
The ratios of $K_2CO_3$ to DE used in these experiments were about 1000 $g_{KOH}$/Kg-DE, 1665 $g_{KOH}$/Kg-DE, 3330 $g_{KOH}$/Kg-DE, and 16650 $g_{KOH}$H/Kg-DE.

Figure 3:
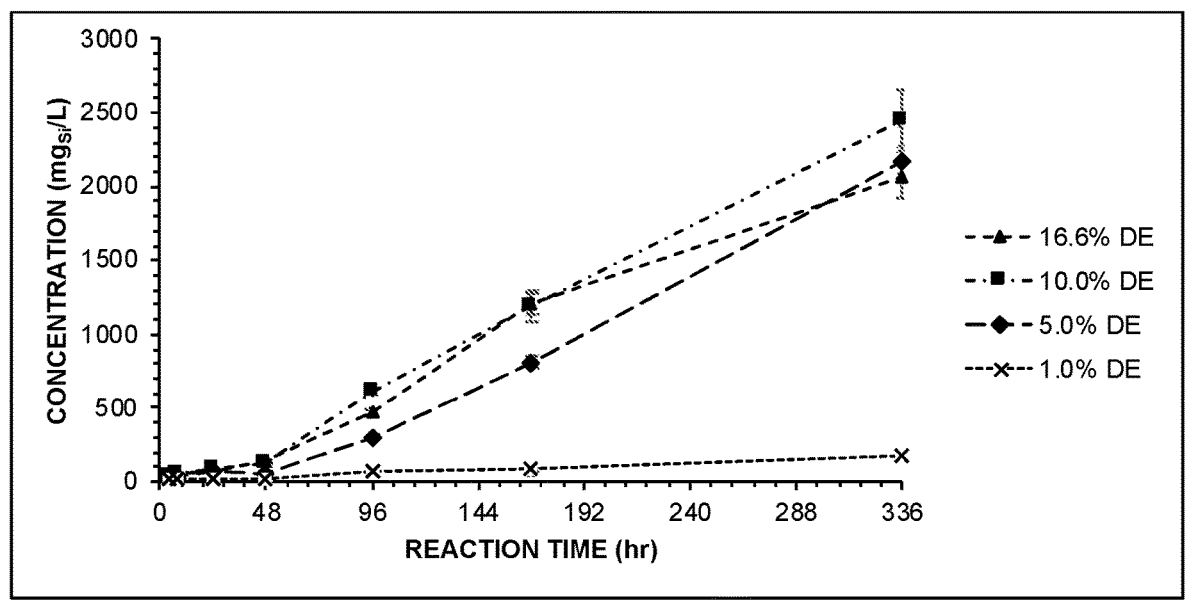
FIG. 3: Effect of initial diatomite concentration on silicon extraction into solution as a function of reaction time.

FIG. 3 outlines the effects of the initial amount of diatomite addition on the silicon concentration in solution, whilst maintaining KOH addition and temperature between experiments. Initial diatomite concentrations within solution were: 16.6%, 10.0%, 5.0%, and 1.0%. Trend lines for initial diatomite concentrations of 16.6%, 10.0%, and 5.0% exhibit a similar rate of reaction. The solution with an initial diatomite concentration of 1.0% did not reach similar silicon concentrations relative to the other samples, due to depletion of available silicon within the diatomite.

Figure 4:
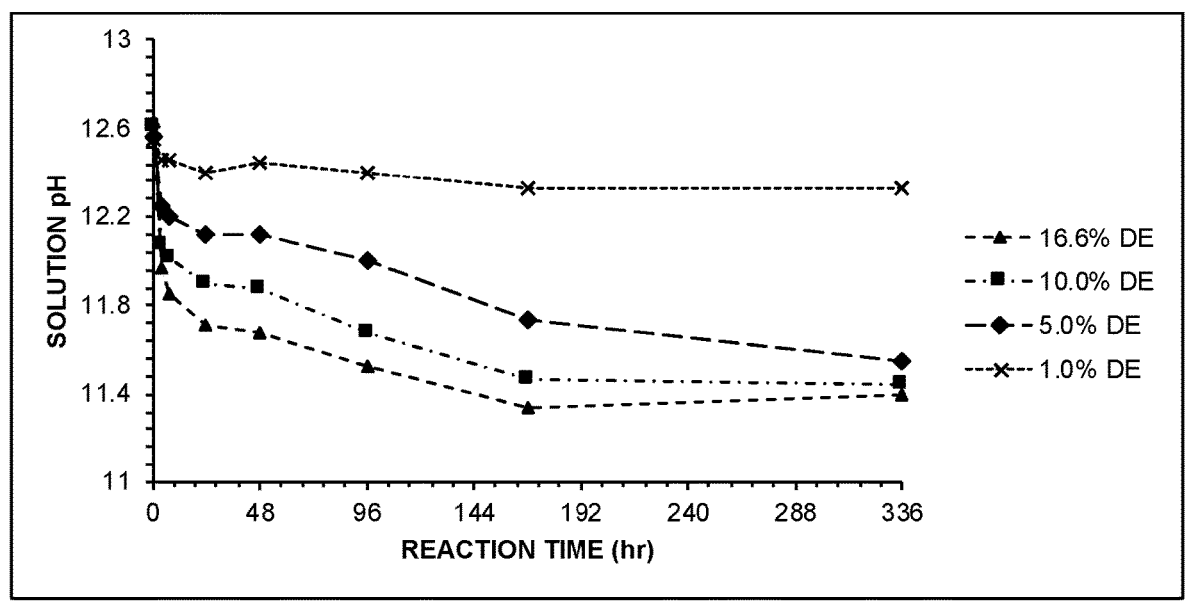
FIG. 4: Effect of initial diatomite concentration on the pH of solution as a function of reaction time.

FIG. 4 outlines the effect of initial diatomite concentration on the pH of solution. A significant decrease in pH is observed initially, which increases with diatomite content. Solution pH stabilises as the reaction extent reaches equilibrium under these process conditions. The relatively high solution pH and low silicon concentrations observed with the 1.0% diatomite trial indicate that the reaction was not limited by process conditions, but rather a lack of available silicon within the material at these rates.

Experiments were conducted in a stainless steel, baffled 20 L electrically heated benchtop vessel, powered by a low shear rotary impeller. Slurry temperature was maintained at 80° C., reaction time at two-hours, and total feed mass of diatomite, KOH, and water was maintained at 10,000 g for each experiment as per Table 6.

Table 6 outlines the effect of varying diatomite concentration within solution. Increasing solution recovery via filtration is linked to decreasing diatomite concentration, whilst increased silicon concentration within solution is linked to increasing diatomite concentration.

TABLE 6

Comparison of key operational parameters as a function of diatomite concentration within initial solution

| PARAMETER | UNITS | INITIAL DIATOMITE CONCENTRATION | | |
|---|---|---|---|---|
| | | 33.0% DE | 25.0% DE | 16.7% DE |
| Initial KOH | wt % | 5.0 | 8.0 | 5.0 |
| Initial diatomite | wt % | 33.0 | 25.0 | 16.7 |
| Solution recovered | wt % | 46 | 59 | 71 |
| Solution pH | — | 12.1 | 12.9 | 13.6 |
| Solution concentration | $g_{Si}$/L | 60.9 | 54.6 | 36.3 |

* Note:
The ratios of KOH to DE used in these experiments were about 100 $g_{KOH}$/Kg-DE, 240 $g_{KOH}$/Kg-DE, and 250 $g_{KOH}$/Kg-DE.

It is preferred to maintain initial diatomite concentration at a range where reaction extent is not limited by available silicon within initial material and final solution pH is maintained at levels practical for dilution applications, whilst still maintaining practical and economical recovery of solution via filtration of reacted slurry.

EXAMPLE 4

Effect of Initial Potassium Hydroxide Concentration in Leaching

Effect of initial potassium hydroxide concentration in was evaluated in this example by reacting three samples of diatomite with KOH at 80° C. for two-hours. Overhead impellers were inserted into the 1 L baffled glass reactors, which was subsequently placed onto a hot plate.

DI water and KOH was added to each reactor as per Table 7 and the solutions agitated with the overhead impellers at 1,000 RPM until no solid alkali was observable. pH and temperature probes were submerged within solution, and the hot plate was adjusted proportionally until the slurry temperature stabilised. 330 g of diatomite was added to each reactor and time was recorded with a stopwatch; with sampling of slurry conducted at intervals of 15, 30, 60, 90, and 120 minutes with a syringe filter, and pH and temperature of the slurry was recorded at each sampling interval.

Figure 5:
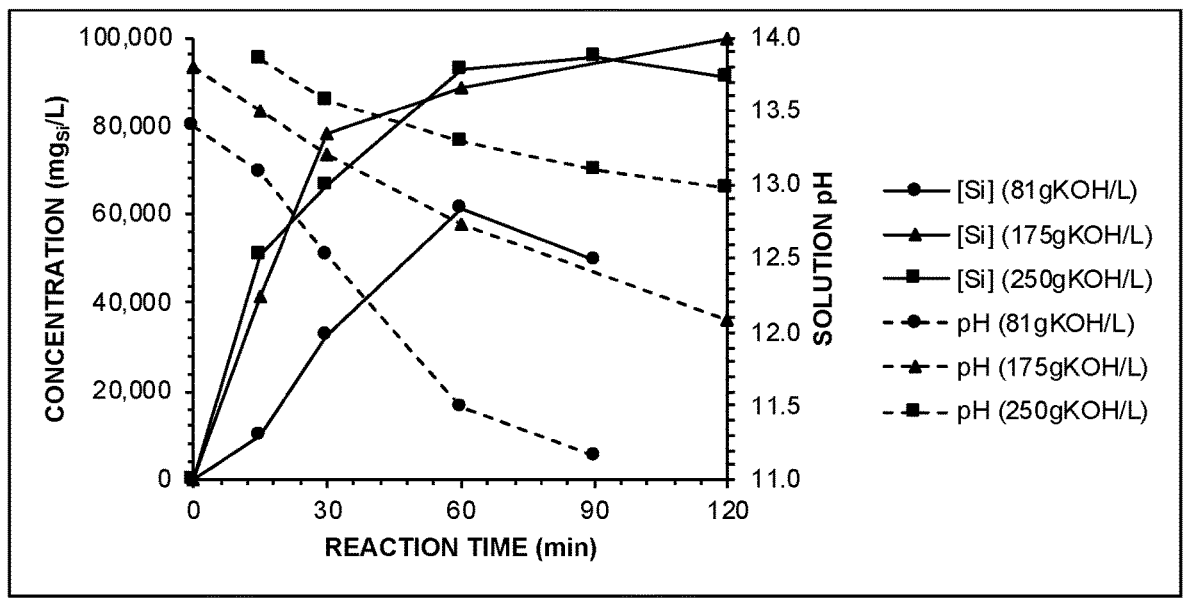
FIG. 5: Effect of initial potassium hydroxide concentration on silicon extraction and the pH of solution as a function of reaction time.

FIG. 5 outlines the effects of the initial KOH addition rates on the silicon concentration and pH in solution; whilst maintaining diatomite addition at 30 wt % and temperature at 80° C. between experiments. Initial KOH concentrations within solution were: 81 $g_{KOH}$/L, 175 $g_{KOH}$/L, and 250 $g_{KOH}$/L (which amounts are equivalent to about 160 $g_{KOH}$/kg-DE, 345 $g_{KOH}$/kg-DE, and 490 $g_{KOH}$/kg-DE respectively). Extraction rates and final silicon concentration showed significant increases above 80 $g_{KOH}$/L, which settled at approximately 60 $g_{Si}$/L after 60 minutes of reaction time. Initial addition rates of 175 $g_{KOH}$/L and 250 $g_{KOH}$/L demonstrated an increased silicon extraction rate, however this levelled out after 60 to 120 minutes of reaction time to approximately 90,000 $mg_{Si}$/L. This may indicate that at approximately 90,000 $mg_{Si}$/L there is a silicon solubility limit under these process conditions; hence limiting further dissolution of silica.

Initial KOH concentration increases the initial solution pH, due to the number of free hydroxides (OH$^-$) formed upon dissolution. Eqn. 3 outlines the driving reaction mechanism for the dissociation of silica into an available ionic silicate speciation. This reaction will proceed until equilibrium under process conditions, until free hydroxides are depleted, or until available silica is depleted.

$$SiO_2 + 4OH^- \leftrightarrow SiO_4^{4-} + 2H_2O \qquad \text{Eqn. 3}$$

Whilst the initial KOH addition rates of 175 $g_{KOH}$/L, and 250 $g_{KOH}$/L both reached a similar final silicon concentration, free hydroxides were depleted at similar rates until this limit was reached; final solution pH's were approximately 12 and 13, respectively. It is preferred to maintain final solution pH at a minimum if similar concentrations of silicon can be achieved; optimising initial KOH addition rates where excess is not added and diminishing returns on silicon extraction are observed.

Table 7 summarises the effects of the initial KOH addition rates on product characteristics. Increasing the initial KOH addition rates significantly increases the solution recovery rate via filtration, however this rate decreases with increasing addition.

Relative silicon concentration within solution at pH 9, assuming linear dilution, is seen to decrease significantly due to the logarithmic nature of pH requiring an order of magnitude increase in silicon concentration to match a similar linear increase in pH.

TABLE 7

Comparison of key operational parameters as a function of potassium hydroxide concentration within initial solution

| PARAMETER | UNITS | 81 $g_{KOH}$/L | 175 $g_{KOH}$/L | 250 $g_{KOH}$/L |
|---|---|---|---|---|
| Initial mass | g | 1,000 | 1,000 | 1,000 |
| Initial KOH | wt % | 5.0 | 10.0 | 13.0 |
| Initial KOH | $g_{KOH}$/L | 80.6 | 175.4 | 250.0 |
| Initial diatomite | wt % | 33.0 | 33.0 | 33.0 |
| Solution recovered | wt % | 46 | 57 | 59 |
| Solution pH | — | 12.1 | 12.9 | 13.8 |
| Solution concentration | $g_{Si}$/L | 60.9 | 91.1 | 89.8 |
| Concentration after dilution to pH 9 | $mg_{Si}$/L | 48 | 11 | <1 |

It is preferred to maintain initial KOH addition at a range where silicon extraction rate and concentration is maximised relative to the final solution pH and required dilution ratio, whilst ensuring that recovery of filtrate is optimised against practical and economic aspects.

EXAMPLE 5

Comparison of Dilution of Silicon Solution Produced Using Potassium Carbonate Versus Potassium Hydroxide For the concentrated soluble silicon solution to be applicable to industry it should be within physiological pH ranges, requiring dilution typically with water. Due to pH being measured on the logarithmic scale, there is a trade-off between concentrated solution pH and the amount soluble silicon within solution; it may be preferable to select a solution with a lower soluble silicon content and a low pH than one with a high soluble silicon content and a high pH.

Dilution of a sample reacted with a 40.0 wt % $K_2CO_3$ lixiviant was conducted via cyclic diluted in tap water, which was measured at pH 7.3 on the day of the tests. The cyclically diluted solutions were then sampled and diluted with sodium hydroxide (NaOH) solution for subsequent silicon concentration measured by ICP. The pH of each diluted solution was measured after completing the set of dilutions, measuring from lowest to highest to avoid cross contamination of alkaline solution into the diluted solutions.

Table 8 outlines the decrease in pH and concentration with dilution, reaching a pH of 9.97 and concentration of 0.6 ppm after a dilution factor of 10,000.

TABLE 8

Effects of dilution on a sample reacted with $K_2CO_3$ lixiviant with DI water on solution pH and silicon concentration

| DILUTION RATE | SOLUTION pH | SILICON CONCENTRATION (mg/L) |
|---|---|---|
| 1 | 12.39 | 5,400.00 |
| 10 | 11.31 | 540.30 |
| 100 | 11.29 | 53.75 |
| 1,000 | 10.77 | 5.55 |
| 10,000 | 9.97 | 0.58 |

Figure 6:
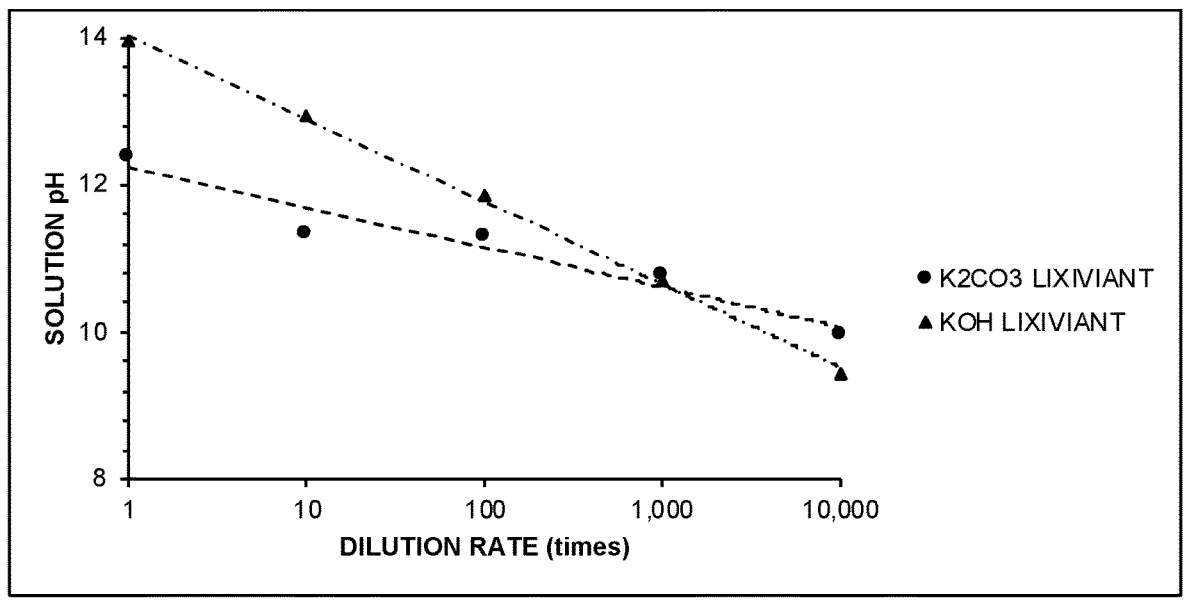
FIG. 6: Comparison of dilution rates on solution pH for silicon solutions prepared with $K_2CO_3$ against KOH.

FIG. 6 displays the relationship between the log molar concentrations of silicon in solution with pH. The linear trend indicates that silicon remains within solution at all stages of dilution. However, pH values for the 10× dilution and 100× dilutions were 11.31 and 11.29, respectively, this small pH drop indicates other factors influencing the required dilution. The sample contained high levels of $K_2CO_3$, which dissociates in solution to form bicarbonate ions. These bicarbonate ions then act as buffers in the presence of hydrogen ions as the pH is decreased; significantly decreasing the pH drop independent of the concentration decrease.

It is preferred that potassium hydroxide is used as the lixiviant for the production of the concentrated silicon solution as opposed to carbonate reagents. This is because the concentrated silicon solution typically requires dilution to reach an appropriate pH prior to application. Carbonate reagents increase the buffering capacity of the solution which in turn means that further dilution is required to reach the appropriate pH. Additionally, potassium is generally a useful mineral for plants.

EXAMPLE 6

Washing to Recover Extra Silica

Effect of washing to recover extra silica was evaluated in this example with leach residue that was produced by reacting diatomite with KOH at 80° C. for three-hours in a 3.5 L baffled stainless steel reactor on a hot plate, with an overhead impeller inserted into the reactor. Total initial mass of the leach was 3,000 g, with 1,000 g diatomite and 2,000 g of 80 $g_{KOH}$/L solution. Upon completion of the leach, the slurry was filtered through a 20 L pressure filter. Once filtrate had been recovered, the mass was measured and the proportional amount of wash-water was added to the filter, and filtration repeated.

Filtration of leached slurry is applied to remove the concentrated silicon solution from the reacted diatomite. Leach solution may remain with the solid fraction upon filtering due to filtration inefficiencies, or potassium, silicate, and hydroxide ions adsorbing or precipitating out of solution as moisture is removed. Washing the dewatered solids with water or alkali solution may increase the solubility of these ions, recovering them into the wash solution as potential product.

Figure 7:
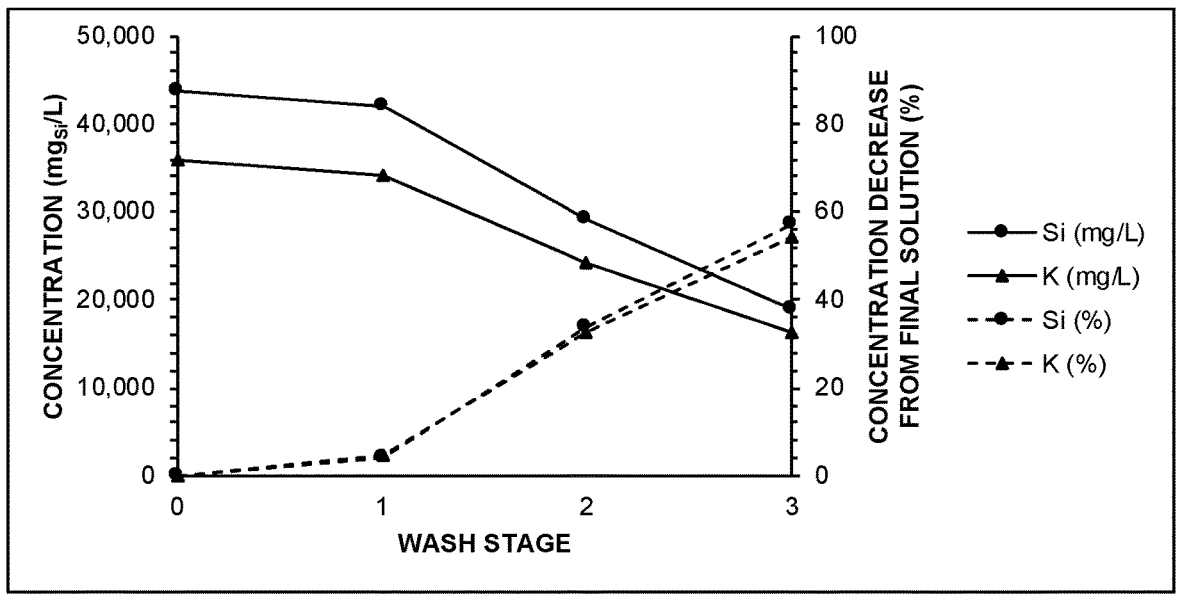
FIG. 7: Silicon and potassium concentration within solution extracted from leach residue with increasing wash stages.

FIG. 7 displays the silicon and potassium concentration within solution extracted from leach residue with increasing wash stages at 1:1 wash water to dried solid filtrate ratio. Initial silicon concentration of filtered product solution was 44 $g_{Si}$/L. Filtered residue was then subject to application of the same mass of liquid removed, whilst remaining within the filter vessel. Filtrate from this wash stage had a total silicon concentration of 42 $g_{Si}$/L, a decrease of approximately 4%. Further wash stages recovered additional dissolved silicon albeit at lower solution concentrations.

It is preferred to incorporate a wash stage to the filtered solids to increase silicon recovery and solution production, whilst maintaining product specifications.

EXAMPLE 7

Effect of Evaporation on Concentrated Silicon Solution

An additional advantageous approach to achieve production of a concentrated silicon containing fertiliser is to include a stage of solution evaporation. Evaporation of the silicon solution may be conducted to further increase the concentration of this solution via removal of excess water. The evaporation process may be carried out using natural, thermal, or vacuum evaporation. During an evaporation process a portion of the water contained within the solution will be removed while the dissolved potassium and silicon ions will remain in the solution, up to the point where they reach their solubility. The main advantage of increasing the silicon concentration in solution by evaporation is that it decreases the amount of solution to be handled and transported to the required location for application, hence providing economic and practical advantages.

The evaporation step is effectively the opposite of the dilution step carried out just prior to applying the solution to plants. The dilution step is required so that the solution is applied to the plants at a suitable pH. Because the evaporation step has the opposite effect to the dilution step, the silicon concentration and pH will still have the same relationship and hence the solution applied to the plants will still have the same pH and silicon characteristics such as those described in example 1. An estimate of the effect of varying extents of water evaporation on the solution volume and characteristics is presented in Table 9.

TABLE 9

Theoretical effect of water evaporation on the concentrated silicon containing solution

| PARAMETER | UNITS | INITIAL VOLUME | EVAPORATION OF 20% VOLUME | EVAPORATION OF 50% VOLUME |
| --- | --- | --- | --- | --- |
| Potassium | g/L | 50.0 | 62.5 | 100.0 |
| Silicon | g/L | 50.0 | 62.5 | 100.0 |
| pH | — | 11.5 | 11.6 | 11.8 |

EXAMPLE 8

Effect of Claimed Concentrated Silicon Solution at Specified Application Rates Versus the Standard Fertiliser Practices on Crop Growth and Development The claimed concentrated silicon solution was trialled at specified foliar application rates with the standard fertilising practices (SFP) and against the SFP. Three replicated, small plot field trials were conducted in Australia on a specified variety of sweetcorn and soil. Silicon solution was applied at rates of 9 L/ha and 15 L/ha with the SFP application, and these were conducted in parallel against the control application of the SFP.

Figure 8:
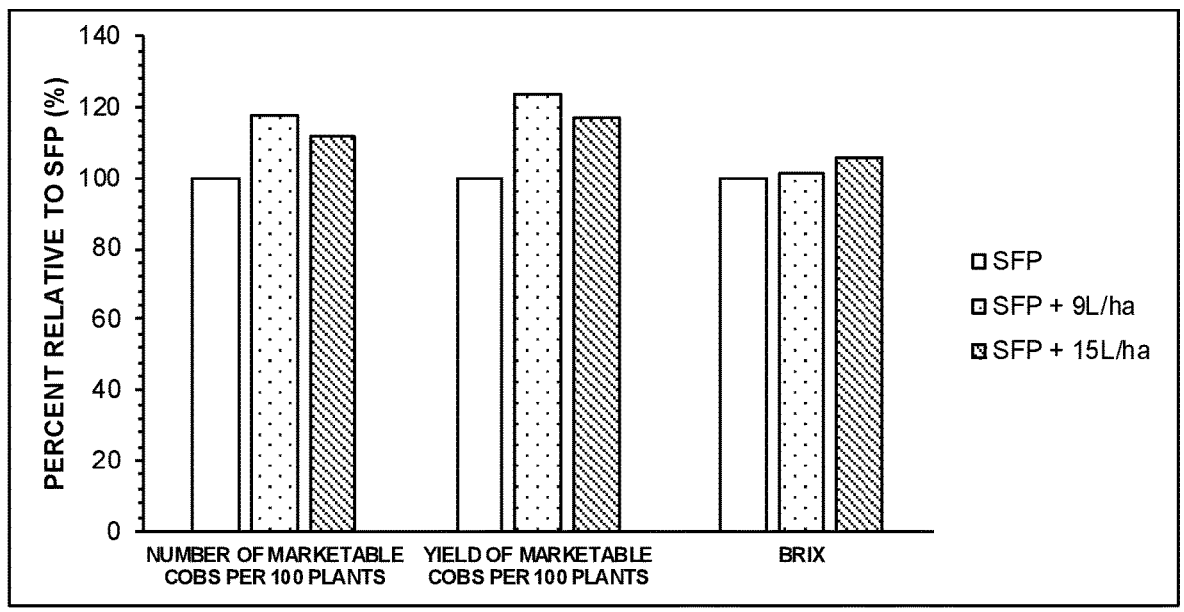
FIG. 8: Effect of claimed concentrated silicon solution on Queensland sweetcorn at specified dilution and application rates in comparison to standard fertiliser practices

FIG. 8 displays the increase in number and yield of marketable cobs per 100 plants, and also the increase in brix relative to the SFP with the applications of 9 L/ha and 15 L/ha in conjunction with the SFP.

A separate field trial was conducted in Australia to evaluate the effect of the claimed concentrated silicon solution at specified foliar application rates with the SFP and against the SFP. Two replicated field trials were conducted on a specified variety of chickpea and soil. Silicon solution was applied at a rate of 4 L/ha with the SFP application, and this was conducted in parallel against the control application of the SFP.

Table 10 displays the increase in yield of chickpea with the application of the SFP plus 4 L/ha of the claimed concentrated silicon solution relative to the SFP and no addition of a silicon concentrate.

TABLE 10

Effect of claimed concentrated silicon solution at
a specified application rate of 4 L/ha with the
SFP versus the SFP on crop growth and development

| PARAMETER | UNITS | SFP | SFP + 4 L/ha |
|---|---|---|---|
| Yield (tonnage) | t/ha | 0.66 | 0.72 |
| Yield (percentage) | % | 100 | 110 |

EXAMPLE 9

Preparation of Solid Residue Including Silicic Species.

There are two primary accepted methods for measuring plant available silicon or plant available silicon.

The method used in the USA for measuring plant available or soluble silicon of solid fertilisers includes a 5-Day test with $Na_2CO_3$—$NH_4NO_3$ test. This test does not convert insoluble amorphous silica to a soluble form, but rather promotes the dissolution of already soluble silicic species for measurement.

Another accepted method for measuring plant available silicon is via extraction with a 0.01M Calcium Chloride solution. 0.01M $CaCl_2$ is known to extract readily available soluble silicic species and is therefore a good measure of the immediately available silicon for plant uptake. As with the testing method used in the USA, this method does not convert insoluble amorphous silica to a soluble form.

In the present case, amorphous silica bearing material is treated with an alkali solution. Table 9 below provides a comparative summary of the soluble silicon species in Wollastonite in comparison with soluble silicon species in calcium silicate slag and the solid residue prepared from solubilising an amorphous silica containing material with an alkali. It will be appreciated that higher concentrations of soluble silicon are attainable depending on the processing conditions.

TABLE 9

Plant available silicon as measured by the SLV 5-Day
$Na_2CO_3$—$NH_4NO_3$ method and the 0.01M $CaCl_2$ method

| | ppm Soluble Silicon measured by | |
|---|---|---|
| Sample | SLV 5-Day $Na2CO3$—$NH4NO3$ | 0.01M CaCl2 method |
| Wollastonite (Vansil W30) | 31,373 | 2,079 |
| Calcium Silicate Slag | 3,129 | 274 |
| Solid Residue | 38,944 | 10,993 |

As can be seen from Table 9, the solid residue has a significantly higher level of silicic species than calcium silicate slags, that are commonly used as fertilisers. Therefore, the amorphous silica is a useful starting material in preparing a solid residue with a high concentration of soluble or solubilisable silicon.

EXAMPLE 10

Production of Solid and Liquid Fertiliser Including Silicic Species from Rice Hull Ash.

A portion of rice hull ash (RHA) having a chemical analysis of: $SiO_2$ (94-99%), Carbon (1-5.5%), Moisture (<1%) is fed into a reactor containing 1.5M KOH solution to form a slurry having a solids content of about 30 wt % solids and a pH of about 13.5 at ambient temperature and atmospheric pressure. The slurry is heated up to about 80° C. and agitated to maintained dispersion of the RHA in the slurry. The leaching reaction is maintained for 2 to 6 hours by which time 50% of silica contained in the RHA has been dissolved into the leachate. The slurry is then filtered to separate the solids (mainly including organic carbon, metals, soluble silicic species and unreacted silica) from the leachate. The solids includes entrained leachate and has a moisture content of 40% w/w solids.

EXAMPLE 11

Production of Solid and Liquid Fertiliser Including Silicic Species from Glass

A portion of crushed glass having a chemical analysis of: $SiO_2$ (>99%), Moisture (<1%) is fed into a reactor containing 2M KOH solution to form a slurry having a solids content of about 20 wt % solids and a pH of about 14 at ambient temperature and atmospheric pressure. The slurry is heated up to about 90° C. and agitated to maintain dispersion of the crushed glass in the slurry. The leaching reaction is maintained for 2 to 6 hours by which time 20% of silica contained in the glass has been dissolved into the leachate. The slurry is then filtered through a filter to separate the solids (mainly including soluble silicic species and unreacted silica) from the leachate. The solids includes entrained leachate and has a moisture content of 30% w/w solids.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method for extracting soluble Si compounds from an inorganic amorphous silica bearing material, the method including:
    leaching the inorganic amorphous silica bearing material with an alkaline solution in a reaction mixture to convert at least a portion of amorphous silica in the inorganic amorphous silica bearing material to a soluble silicic species and form a leachate including the soluble silicic species and a solid residue; and
    separating the leachate from the solid residue to form an aqueous leachate solution, wherein an amount of the alkaline solution of a sufficient pH is used so that, after the step of separating the leachate from the solid residue, the leachate has a pH of 11 or greater;
    wherein the step of leaching the inorganic amorphous silica bearing material with the alkaline solution is conducted at a temperature of from ambient to 95° C.; and
    wherein the step of leaching the inorganic amorphous silica bearing material with the alkaline solution is conducted in the absence of a humic acid-containing raw material.

2. The method of claim 1, wherein the step of leaching the inorganic amorphous silica bearing material with the alkaline solution includes initially forming a reaction mixture of the inorganic amorphous silica bearing material and the alkaline solution.

3. The method of claim 2, wherein the method further includes heating the reaction mixture to a temperature greater than ambient and up to 95° C. under ambient pressure.

4. The method of claim 2, wherein the inorganic amorphous silica bearing material is present in the reaction mixture at an amount of from about 5 wt % to about 85 wt %.

5. The method of claim 1, wherein the alkaline solution is a potassium hydroxide solution.

6. The method of claim 5, wherein KOH is present in an amount of from 20 g/L up to 120 g/L.

7. The method of claim 1, wherein the step of leaching the inorganic amorphous silica bearing material with potassium hydroxide is conducted for a time of at least 0.5 hours and up to 96 hours.

8. The method of claim 7, wherein the time is up to 8 hours.

9. The method of claim 1, wherein the step of leaching the inorganic amorphous silica bearing material with the alkaline solution is conducted at a temperature of from about 50° C. to about 95° C.

10. The method of claim 1, wherein the reaction mixture includes an amount of the alkali solution of the sufficient pH to provide the reaction mixture with an initial pH of 10.8 or greater.

11. The method of claim 1, wherein the step of leaching the inorganic amorphous silica bearing material with the alkaline solution is conducted at ambient pressure.

12. The method of claim 1, wherein the inorganic amorphous silica bearing material is diatomaceous earth.

13. The method of claim 1, wherein the soluble silicic species is in the leachate at a concentration of from 10 g-Si/L to 100 g-Si/L.

14. The method of claim 1, wherein the solid residue includes residual potassium silicates.

15. The method of claim 1, wherein the method further includes subjecting the aqueous leachate solution to evaporation to further concentrate the soluble silicic species.

16. The method of claim 1, wherein the method further includes diluting the aqueous leachate solution to a pH suitable for application to plants.

17. A method for preparing a solid residue including reacted silica from an inorganic amorphous silica bearing material, the method including:
    treating the inorganic amorphous silica bearing material with an alkaline solution in a reaction mixture to convert at least a portion of amorphous silica in the inorganic amorphous silica bearing material to a reacted silica and form a leachate and a solid residue including the reacted silica; and
    separating the leachate from the solid residue to form an aqueous leachate solution, wherein an amount of the alkaline solution of a sufficient pH is used so that, after the step of separating the leachate from the solid residue, the leachate has a pH of 11 or greater;
    wherein the step of treating the inorganic amorphous silica bearing material with the alkaline solution is conducted at a temperature of from ambient to 95° C.; and
    wherein the step of treating the inorganic amorphous silica bearing material with the alkaline solution is conducted in the absence of a humic acid-containing raw material.

* * * * *